US005215617A

United States Patent [19]

Grupe

[11] Patent Number: 5,215,617

[45] Date of Patent: Jun. 1, 1993

[54] METHOD FOR MAKING PLIED TOWELS

[75] Inventor: Edward H. Grupe, Appleton, Wis.

[73] Assignee: Kimberly-Clark Corporation, Neenah, Wis.

[21] Appl. No.: 660,329

[22] Filed: Feb. 22, 1991

[51] Int. Cl.[5] B32B 27/02; B32F 1/20

[52] U.S. Cl. 156/209; 156/292

[58] Field of Search 156/209, 219, 553, 292, 156/290; 264/284; 425/385; 118/247, 249

[56] References Cited

U.S. PATENT DOCUMENTS

| | | | |
|---|---|---|---|
| 2,089,949 | 8/1937 | Drewsen | 101/153 |
| 3,130,412 | 4/1964 | Cox et al. | 425/385 X |
| 3,170,974 | 2/1965 | Jacobs | 264/284 |
| 3,867,225 | 2/1975 | Nystrand | 156/209 |
| 4,105,491 | 8/1978 | Haase et al. | 156/553 |
| 4,110,152 | 8/1978 | Dunning et al. | 156/553 |
| 4,211,743 | 7/1980 | Nauta et al. | 264/284 |
| 4,260,443 | 4/1981 | Lindsay | 156/283 X |
| 4,307,141 | 12/1981 | Walburn | 156/209 X |
| 4,483,728 | 11/1984 | Bauernfeind | 156/209 |
| 4,543,142 | 9/1985 | Kuepper et al. | 156/219 X |

FOREIGN PATENT DOCUMENTS

| | | | |
|---|---|---|---|
| 627355 | 3/1936 | Fed. Rep. of Germany | 156/582 |
| 2093283 | 1/1972 | France . | |
| 2289992 | 10/1974 | France . | |
| 1140083 | 1/1969 | United Kingdom . | |
| 2046666A | 11/1979 | United Kingdom . | |

*Primary Examiner*—Michael W. Ball
*Assistant Examiner*—Michelle Yoder
*Attorney, Agent, or Firm*—G. E. Croft

[57] ABSTRACT

The quality of glued nested paper towels is improved by embossing at least one of the two plies using a matched rubber embossing roll and applying adhesive to that embossed ply using a rotogravure printing roll while the ply is backed by the matched rubber embossing roll. The use of a matched rubber embossing roll reduces strength degradation of the ply during embossing and permits the use of rotogravure adhesive printing, which provides metered application of adhesive with less adhesive strike-through.

10 Claims, 1 Drawing Sheet

METHOD FOR MAKING PLIED TOWELS

BACKGROUND OF THE INVENTION

In the manufacture of paper towels, it is well known to produce nested glued towels in which two plies of creped tissue web are individually embossed and married together with adhesive such that the protrusions of one embossed web contact the depressions of the other embossed web. Such a product is advantageous because of its increased bulk compared to other two-ply products of similar basis weight. An example of such a process and product is illustrated in U.S. Pat. No. 3,867,225 to Nystrand and U.S. Pat. No. 4,543,142 to Kuepper et al. The Nystrand patent discloses embossing the two webs between an engraved steel roll and a smooth rubber roll, wherein the adhesive is applied to the protrusions of one of the steel rolls. The Kuepper patent discloses a similar process wherein the two webs are embossed between matched steel embossing rolls. However, both of these processes have disadvantages relating to product strength loss, adhesive strike-through, or rubber roll degradation.

SUMMARY OF THE INVENTION

It has now been discovered that the disadvantages of the prior art methods can be overcome by combining the technologies of laser engraving and rotogravure printing and applying them to the manufacture of multi-ply paper towels.

More specifically, the invention resides in a method for making a two-ply paper towel comprising: (a) embossing a first paper ply between a first pair of matched embossing rolls consisting of first and second embossing rolls, wherein the surface of the second embossing roll is rubber, to form a pattern of protrusions extending outwardly from the first ply; (b) embossing a second paper ply between a second pair of matched embossing rolls consisting of third and fourth embossing rolls to form a pattern of protrusions extending outwardly from the surface of the second ply; (c) applying adhesive to the protrusions of the embossed first ply using a rotogravure printing roll while the first ply is backed by the second embossing roll; (d) marrying the embossed second ply to the embossed first ply by contacting the adhesive-containing protrusions of the first embossed ply with portions of the second embossed ply. Preferably, the adhesive-containing protrusions of the first embossed ply are placed in contact with portions of the second embossed ply which lie between the protrusions of the second ply. This results in a glued nested product. However, it is also within the scope of this invention to produce a pin-to-pin embossed product as well, which can be accomplished by adjusting the registry of the second and third embossing rolls such that the protrusions of one ply align with protrusions of the other ply.

An important feature of this invention is the presence of a matched rubber embossing roll (designated as the second embossing roll) which serves the dual function of embossing the first ply and providing a rubber backing roll for the rotogravure printing roll. For purposes herein, the term "matched" means that the male embossing elements of one embossing roll of an embossing roll pair intermesh with, and are preferably substantially identical in shape to, the corresponding female embossing elements of the other embossing roll of the embossing roll pair. In the case of conventional matched steel embossing rolls, the second roll is made from the first roll to ensure an almost perfect match within certain manufacturing tolerances. Today, with the further development of laser engraving, the concept of matched embossing rolls can be extended to rubber rolls. As a result, any combination of steel/rubber or rubber/rubber matched embossing rolls is within the scope of this invention, provided that the embossing roll which doubles as a backing roll for the rotogravure adhesive application is rubber.

As used herein, the term "rubber" means any material which has a hardness of about 100 Shore A or less, preferably from about 50 to about 80 Shore A hardness. Such materials can be easily laser engraved to the desired embossing element shape and they are more forgiving to the web being embossed such that the strength of the web is not degraded as much as when using steel/steel matched embossing rolls.

Rotogravure printing rolls and the attendant apparatus are well known in the printing industry. Such printing systems are also useful for applying adhesives in a very precise manner which avoids over application of adhesive and the resulting strike-through of the adhesive through the web. Rotogravure printing rolls having a cell size of from about 2 to about 15 billion cubic microns per square inch are believed to be suitable for applying adhesives having a viscosity of from about 50 to about 400 centipoise, although it will be appreciated that the rotogravure print roll must be designed to take into account the properties of the particular adhesive and the characteristics of the webs being glued together.

DETAILED DESCRIPTION OF THE INVENTION

Figure 1:
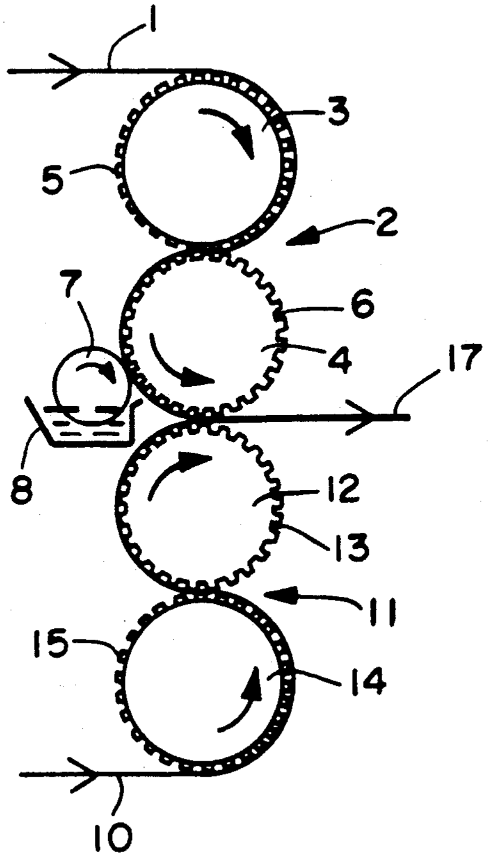
FIG. 1 is a schematic diagram of a method in accordance with this invention, illustrating the interaction of the embossing roll pairs and the rotogravure printing station.

Referring to the drawing, the invention will be described in greater detail. FIG. 1 illustrates one aspect of this invention, wherein a first paper ply 1 is embossed by a first matched embossing roll pair 2. The first matched embossing roll pair consists of a first matched embossing roll 3 and a second matched embossing roll 4. The first matched embossing roll is a steel roll having male embossing elements 5 which protrude from the surface of the embossing roll. The first matched embossing roll can be any material, however, including rubber. The second matched embossing roll is a rubber covered roll having female embossing elements 6 which are depressions in the surface of the embossing roll and which are matched to the male embossing elements of the first embossing roll. It will be appreciated that either the first or second embossing rolls can have male or female embossing elements, or both rolls can have male and female embossing elements as illustrated in the above-mentioned U.S. Pat. No. 4,543,142 to Kuepper et al., which is herein incorporated by reference. As previously mentioned, the rubber covered second embossing roll not only is advantageous for improving the embossing of the first ply, but it also serves as a backing roll for the rotogravure printing roll 7.

The rotogravure printing apparatus can be any conventional rotogravure printing apparatus useful for printing the particular adhesive being used. As illustrated, such printing apparatus includes the printing roll, a reservoir 8 of adhesive, and a doctor blade for removing excess adhesive after the printing cells within the printing roll are filled.

A second ply 10 is embossed by a second matched embossing roll pair 11 which consists of a third matched embossing roll 12 having female embossing elements 13 and a fourth matched embossing roll 14 having male embossing elements 15. The embossing pattern of the second embossing roll pair can be the same or different from the embossing pattern of the first embossing roll pair. For example, the protrusions of the first ply can be slightly deeper than those of the second ply in order to create greater air space and bulk as hereinafter illustrated in FIG. 3. Also, in the embodiment of this invention as illustrated in FIG. 1, it is necessary that embossing rolls 4 and 12 be in registry such that the two plies nest together, i.e. the protrusions of the first ply must fall between the protrusions of the second ply.

In operation, the first ply is embossed between the first and second embossing rolls and adhesive is applied to the protruding portions of the ply by the rotogravure print roll. Simultaneously, the second ply is embossed between the second and third embossing rolls and thereafter brought into contact with the first ply such that the adhesive-containing portions of the first ply contact the portions of the second ply which lie between the protrusions of the second ply. The resulting product 17 is a two-ply, glued, nested product.

Figure 2:
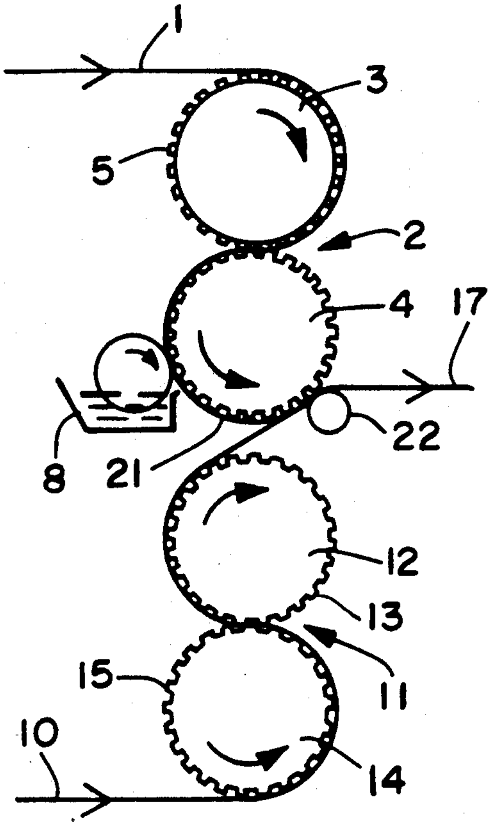
FIG. 2 is an alternative embodiment of this invention similar to that shown in FIG. 1 in which a marrying roll is used to ply the two plies together.

FIG. 2 illustrates another embodiment of this invention which is very similar to that illustrated in FIG. 1, but which combines the two plies in a slightly different manner. More specifically, the embossed, adhesive-containing first ply 21 is brought into contact with the second ply in a nip between a rubber marrying roll 22 and the second embossing roll. An advantage of this embodiment is the elimination of the tight clearances between the second and third embossing rolls of the first embodiment.

Figure 3:
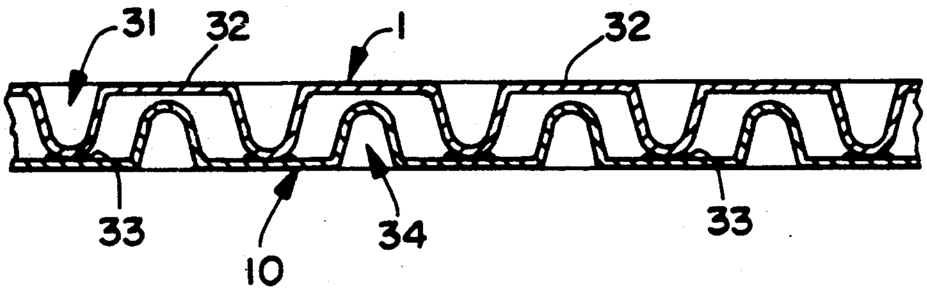
FIG. 3 is a schematic cross-sectional view of a glued nested product made in accordance with this invention.

FIG. 3 is a cross-sectional schematic of a glued nested two-ply product 17 resulting from the methods illustrated in FIGS. 1 and 2. Shown is the first ply 1 in which the embossments 31 protrude from the undeflected plane 32 of the first ply. The adhesive 33 applied to the embossments by the rotogravure printing adheres the first ply and second ply 10 together. As is preferred, the two-ply product illustrated in FIG. 3 is the result of embossing the second ply with an embossing pattern having shallower embossments than those of the first ply embossing pattern. This permits the adhesive-containing embossments of the first ply to contact the second ply while leaving an air space between the embossments 34 of the second ply and the undeflected portions 32 of the first ply.

It will be appreciated that the foregoing description, given for purposes of illustration, is not to be construed as limiting the scope of this invention, which is intended to include all equivalents thereto.

I claim:

1. A method for making a two-ply paper towel comprising:

(a) embossing a first paper ply between a first pair of matched embossing rolls consisting of first and second embossing rolls, wherein the surface of the second embossing roll is rubber, to form a pattern of protrusions extending outwardly from the surface of the embossed first ply;

(b) embossing a second paper ply between a second pair of matched embossing rolls consisting of third and fourth embossing rolls to form a pattern of protrusions extending outwardly from the surface of the embossed second ply;

(c) applying adhesive to the protrusions of the embossed first ply using a rotogravure printing roll while the first ply is backed by the second embossing roll; and (d) marrying the embossed second ply to the embossed first ply by contacting the adhesive-containing protrusions of the first embossed ply with portions of the second ply.

2. The method of claim 1 wherein the first and second ply are married by contacting the adhesive-containing portions of the first ply with portions of the second ply which lie between the protrusions of the second ply.

3. The method of claim 1 wherein the first embossing roll is steel.

4. The method of claim 1 wherein the third embossing roll is rubber and the fourth embossing roll is steel.

5. The method of claim 1 wherein the third and fourth embossing rolls are rubber.

6. The method of claim 1 wherein the first embossing roll is rubber.

7. The method of claim 1 wherein all of the embossing rolls are rubber.

8. The method of claim 1 wherein the first and second plies are married together between the second embossing roll and a marrying roll.

9. The method of claim 1 wherein the first and second plies are married together between the second and third embossing rolls.

10. A method for making a two-ply nested paper towel comprising:

(a) embossing a first paper ply between a first pair of matched rubber embossing rolls, consisting of first and second embossing rolls, to form a pattern of protrusions extending outwardly from the surface of the embossed first ply;

(b) embossing a second paper ply between a second pair of matched rubber embossing rolls, consisting of third and fourth embossing rolls, to form a pattern of protrusions extending outwardly from the surface of the embossed second ply;

(c) applying adhesive to the protrusions of the embossed first ply using a rotogravure printing roll while the first ply is backed by the second embossing roll; and (d) marrying the embossed second ply to the embossed first ply between a marrying roll and the second embossing roll by contacting the adhesive-containing protrusions of the first embossed ply with portions of the second embossed ply which lie between the protrusions of the second embossed ply.

* * * * *